Patented Nov. 13, 1934

1,980,342

UNITED STATES PATENT OFFICE 1,980,342

SULPHONATED OILS, FATS OR ACIDS THEREOF AND THE PROCESS OF MANUFACTURING THE SAME

Rudolf Kern, Oschatz, Germany, assignor to the firm Chemische Fabrik R. Baumheier Aktiengesellschaft, Zschollau, near Oschatz, Germany No Drawing. Application August 4, 1931, Serial No. 555,147. In Germany August 6, 1930

4 Claims. (Cl. 87—12)

My invention relates to improvements in sulphonated oils, fats or acids thereof initially having unsaturated linkages and the process of manufacturing the same.

It has heretofore been proposed to treat unsaturated fatty acids with chlorosulphonic acid ethyl ester. Further, it has been proposed to sulphonate fatty acids and their derivatives by means of the product of the reaction of acetic acid salts and concentrated sulphuric acid, in which process also dehydrating media such as concentrated phosphoric acid, phosphorous anhydrides and phosphorous chlorides have been added. Further, it has been proposed to treat unsaturated hydroxylized fatty acids with the product of the reaction of fuming sulphuric acid and lower fatty acids, or to cause the reaction of fatty acids with the product of the reaction of glacial acetic acid and $SO_3$, or to combine alkyl groups in the form of esters by the reaction of sulphuric acid esters and fatty acids or sulpho fatty acids.

The object of the improvements is to provide a process in which fatty acids with unsaturated linkages, or oils and fats thereof are sulphonated, for the purpose of making the same soluble in water, by means of sulphuric acid, in which one or two hydrogen atoms have been substituted by organic radicals without any inorganic substituent being present, a condensation medium or a plurality of condensation media being subsequently used, such for example as chlorosulphonic acid, phosphorous oxychlorides, phosphorous chlorides, aluminium chloride, thionylchloride, sulphuryl chloride, phosphorus pentoxide either alone or in mixture. Particularly when using chlorosulphonic acid alone or in mixture with the aforesaid substances the formation of insoluble condensation products is avoided. The substituents of the sulphuric acid may be alkyls, acyls, aryls, the substituents thereof such as aralkyls, nitroaryls, etc.

The substituted sulphuric acid may be directly added to the substance to be made soluble in water, or in such a way that one or both of the components of the reaction are in solution. Further, also the subsequent condensation may be performed in solution.

By the reaction of the condensing medium and the substituted sulphuric acid clear neutral oils are obtained which are very stable as against alkalies, sulphuric acid and magnesium sulphate, which have a good wetting property, and which may be used for example in the textile art for dispersing and emulsifying, for making a paste of powders which are not readily wetted, and as an addition to soap and washing media.

Example 1.—160 parts of butyl sulphuric acid are slowly added while stirring into 80 parts of castor oil. The product is stirred at a temperature of 40° C. with 100 parts of chloro-sulphonic acid until the sulphonate is soluble in water, poured on ice, whereupon the acid is removed by washing with salt solution. The solution of the sodium salt is very stable as against acids, and it has a high wetting power.

Example 2.—100 parts of glycerintrisulphuric acid are stirred with 280 parts olive oil fatty acid at a temperature of from 5 to 15° C., and the mixture is condensed at a temperature of 40° with 200 parts of chlorosulphonic acid. After the sulphonate has become soluble in water it is allowed to stand from 2 to 3 hours and neutralized in the presence of salt solution. The neutral oil is separated, it has a light color and it is suitable as a reviving medium in cotton dyeing.

Example 3.—112 parts of dimethyl sulphate are mixed, while slowly heating, with 300 parts of castor oil to produce a clear solution, which solution is cooled while stirring. To the emulsion thus obtained 350 parts of chlorosulphonic acid are added. After a short period of time the sulphonate is soluble in water, and thereafter it is worked up in the usual way. The calcium and magnesium salts are soluble in water.

Example 4.—140 parts of acetyl sulphuric acid are slowly stirred with 270 parts of ricinoleic acid at a temperature of from 15 to 20° C. and condensed with chlorosulphonic acid while further stirring at 30° C. until the sulphonate is soluble in water. The product is washed with glacial sodium sulphate, the major part is neutralized, the almost neutral oil layer is separated and completely neutralized.

Example 5.—94 parts of acetyl sulphuric acid are uniformly stirred at a temperature below 20° C., with 81 parts of castor oil, and the product of the reaction is further stirred several hours. Thereafter 116 parts of chlorosulphonic acid are gradually added.

During this process uniformly 5 parts of aluminium chloride are stirred into the matter, and the product of the reaction is allowed to stand several hours. Thereafter the sulpho acid is carefully separated, thereby freed of the excess of sulphuric acid and aluminium ions and neutralized. The result is a dark-red very viscous neutral oil which is not dimmed with magnesium sulphate and alkali solutions or mercerizing lye,

*Example 6.*—130 parts glycol sulphuric acid are introduced with vigorous stirring into 200 parts of oleic acid at 25°. After a short time this is condensed with 35 parts of phosphorus pentachlorid and the temperature meanwhile is slowly increased up to 45°. After standing for three hours the sulphuric acid ester is washed with a glacial solution of Glauber's salt, neutralized with ammonia, salted out from a hot solution by means of sodium chlorid and then the segregated neutral oil is separated from the aqueous phase. It possesses a good stability against electrolytes.

*Example 7.*—64 parts of orthochlorophenyl are dissolved in 50 parts of ether and are reacted at 0° C. with 58 parts of chlorosulphonic acid to form orthochlorophenyl sulphuric acid. To this solution there are added 125 parts of castor oil and condensation is subsequently effected at 40° with 140 parts of chlorosulphonic acid with or without addition of chloride of aluminum or phosphorus. After a few hours the mass is neutralized with soda. The neutral oil separates out quantitatively. It is a dark red oil which foams freely in aqueous solution and is very resistive to mineral acids.

By acid condensation agents are understood those which bring about a new union of atoms or the formation of elements or simple chemical compounds as $H_2O$, $HCl$, $CO_2$, $SO_2$, from the reaction products (Houben-Weyl, "Die Methoden der organishen Chemie", vol. II, 1925, page 717).

I claim:

1. The herein described product, which is a sulphonated oil, fat or acid thereof and which is manufactured by treating a non-sulphonated oil, fat or acid thereof having unsaturated linkages with sulphuric acid in which at least one atom of hydrogen has been substituted by an alkyl group, and subsequently adding at least one condensation agent.

2. The herein described product, which is a sulphonated oil, fat or acid thereof and which is manufactured by treating a non-sulphonated oil, fat or acid thereof having unsaturated linkages with sulphuric acid in which at least one atom of hydrogen has been substituted by an aryl group, and subsequently adding at least one condensation agent.

3. The herein described product which is a sulphonated oil, fat or acid thereof and which is manufactured by treating a non-sulphonated oil, fat or acid thereof having unsaturated linkages with sulphuric acid in which at least one atom of hydrogen has been substituted by an acyl group, and subsequently adding at least one condensation agent.

4. The herein described process of manufacturing sulphonated oils, fats or acids thereof, which consists in treating non-sulphonated oils, fats, or acids having unsaturated linkages with sulphuric acid in which at least one atom of hydrogen has been substituted by a substance selected from organic groups consisting of alkyls, aryls, acyls, and the substituents thereof, and subsequently adding at least one condensation agent.

RUDOLF KERN.